Inventor
CLARENCE LEO AERNI,

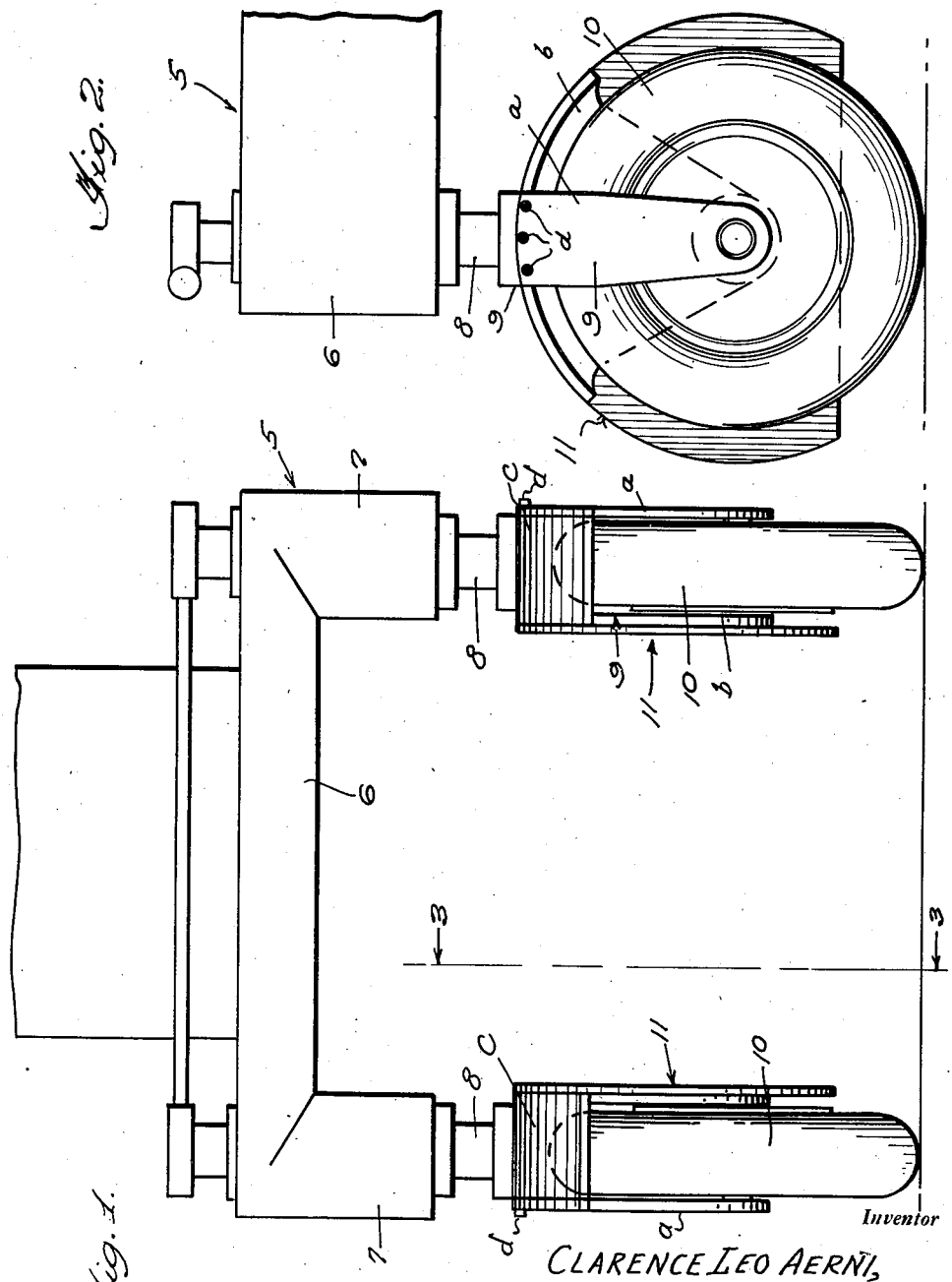

By *Clarence A. O'Brien*

Attorney

June 27, 1944.    C. L. AERNI    2,352,464
TIRE GUARD FOR STRADDLE TRUCKS
Filed Oct. 23, 1941    3 Sheets-Sheet 3
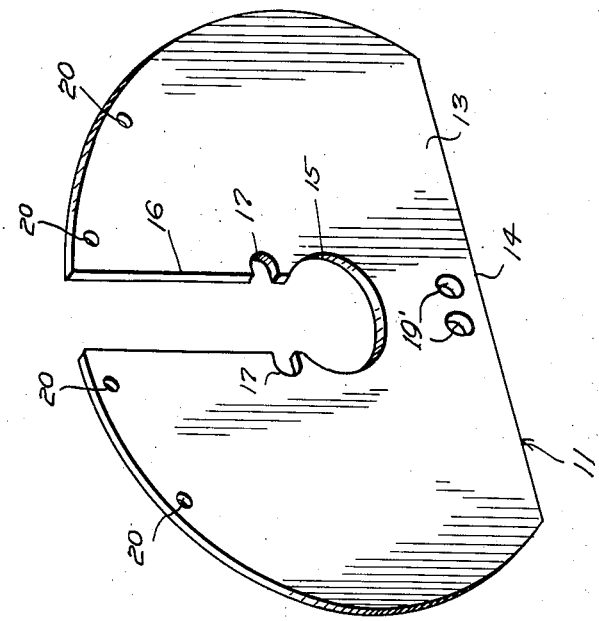
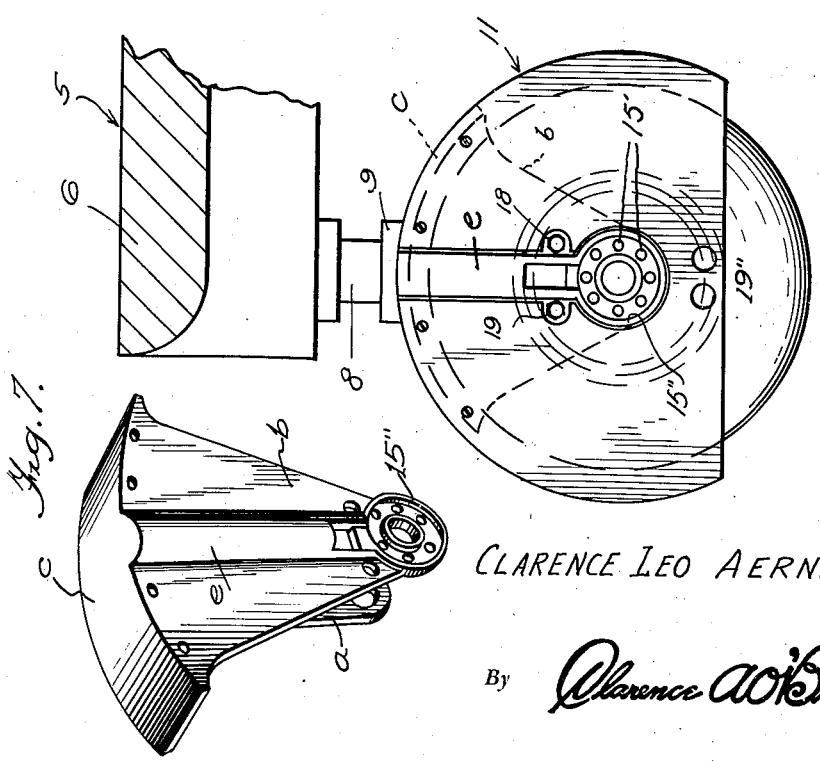
Inventor
CLARENCE LEO AERNI,
By *Clarence A. O'Brien*
Attorney Patented June 27, 1944

2,352,464

UNITED STATES PATENT OFFICE 2,352,464

TIRE GUARD FOR STRADDLE TRUCKS

Clarence Leo Aerni, Ferriday, La.

Application October 23, 1941, Serial No. 416,273

1 Claim. (Cl. 280—160)

This invention relates to new and useful improvements in tire guards which can be used for a number of purposes, the principal one of which is to guard the tires on the wheels of straddle trucks, such as are used for carrying lumber in the great lumbering States of the United States.

At present, when the wheels of lumber carrying straddle trucks are steered they frequently wipe against the load and this contact obviously causes wear on the tires.

Therefore, it is the principal object of the present invention to provide a guard for each wheel of a straddle truck so that the lumber or load carried by the truck cannot engage any one of the tires, thus eliminating load wear on the side walls of the tires, which heretofore has caused such damage to the tires as to make the tires practically useless in a short time in spite of the presence of good treads.

Other objects and advantages of the invention will become apparent to the reader of the following description.

In the drawings:

Figure 1 represents a fragmentary front elevational view of a straddle truck with the tire guards in place.

Figure 2 is a fragmentary side elevational view showing the tire guards in place.

Figure 3 is a fragmentary vertical sectional view taken substantially on line 3—3 of Figure 1.

Figure 4 is a perspective view of one of the guards.

Figure 7 is a view in perspective of one of the forks.

Figure 5:
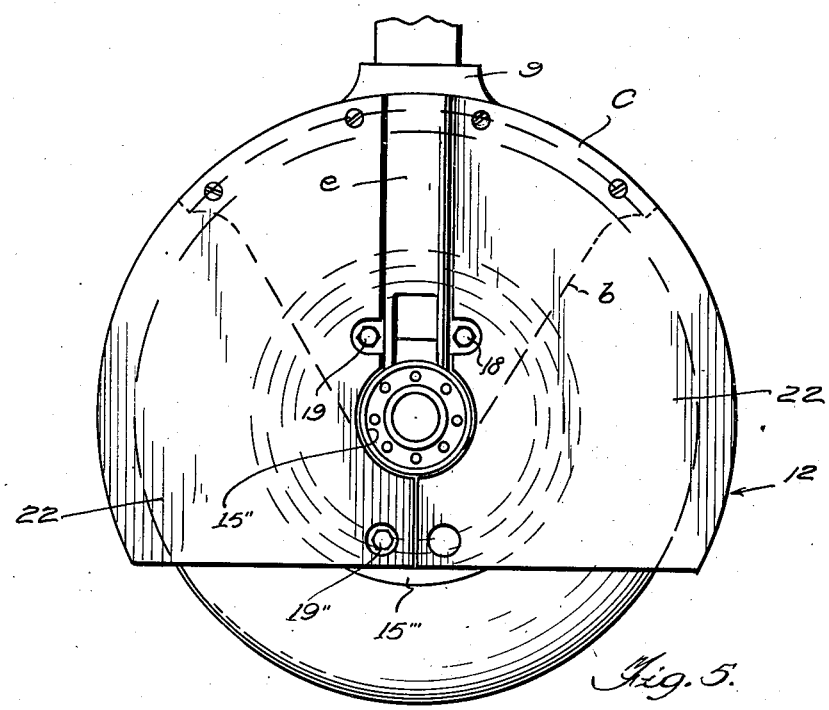
Figure 5 is a fragmentary inside elevational view showing a two-part guard.

Referring to the drawings wherein like numerals designate like parts, it can be seen that numeral 5 generally refers to a straddle truck which includes a frame 6 having vertical corner cases 7, vertically through which are journaled spindles 8 rising from forks 9, in which wheels 10 are mounted.

The fork 9 embraces an outside substantially narrow leg $a$ and an inside substantially 60° segmental leg $b$, which leg is provided at its upper edge with an arcuate-shaped outwardly extending flange $c$ to which the leg $a$ is attached by bolts or the like $d$, this leg $a$ being removable so as to permit removal of the corresponding wheel 10.

Figure 6:
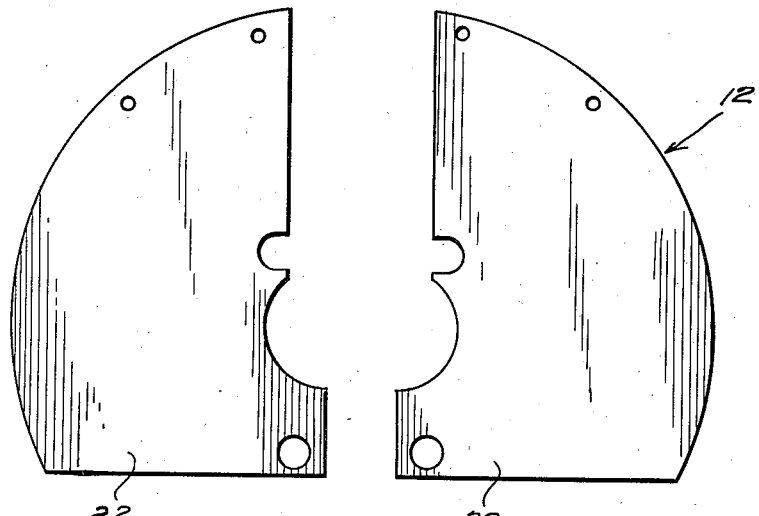
Figure 6 is an elevational view showing the two-part guard with its sections in separate relation.

In carrying out the present invention, a tire guard, such as is shown in Figure 4 and generally referred to by numeral 11, can be employed, or a form of guard such as is shown in Figures 5 and 6 and generally referred to by numeral 12 can be employed. One is of integral construction and the other of sectional construction.

In regard to the form of the invention as denoted by numeral 11, it can be seen that a plate 13 is stamped out in substantially circular form, but having its lower portion cut off on a straight edge 14 so as to be well above the ground when the guard plate is in place.

The plate 13 is formed substantially at its center with a circular opening 15 for surrounding an annular flange 15″ formed on the lower end of the leg $b$ and surrounding a series of bolts 15′ securing the brake drum 15‴ to said leg.

Since the inner fork leg $b$ is ordinarily formed with a vertically extending and outwardly protruding bulge $e$ to accommodate certain mechanism relative to the corresponding wheel, the plate 13 is formed with a substantially wide slot extending downwardly from the top thereof to merge with the opening 15, this slot being denoted by numeral 16. The slot 16 has its edge portions formed with cut away portions 17 so that access can be readily had to the usual primary clearance adjusting nuts 18 (see Fig. 3) of the wheel brakes. A pair of openings 19′ are provided adjacent the edge 14 of the plate 13 in said plate upon opposite sides of the vertical center of the same for access to the usual secondary clearance adjusting nut 19″ of the wheel brake, not shown.

Openings 20 are formed in the upper edge of the plate 13 and threaded members can be disposed through these openings and into the arcuate flange $c$ at the upper edge of the fork leg $b$.

It is also preferable that the edges of the plate 13 at the slot 16 be spot welded to the segmental leg $b$.

To facilitate application and removal of the guard plate, the guard plate may be constructed as shown in Figure 6. This sectional guard is generally referred to by numeral 12 and is divided into a pair of sections 22, 22. These sections 22, 22 when brought together form a guard exactly as represented in Figure 4 and is applied in the same position as shown in Figure 3, and in this connection a comparison can be made with Figure 5.

Obviously, there are on the market other forms of straddle trucks besides that represented in the drawings here and a certain one of these other types does not have a bulge e on its inside fork leg, thus eliminating the necessity of having the plate 13 slotted as at 16.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

The combination with a wheel fork having a vertical leg provided at its lower end with an annular flange on one side of the leg, a vertical central bulge on said side of the leg forming a rib extending upwardly from said flange, and an arcuate lateral wheel guarding flange at the upper end of the leg and on the other side thereof, of a plate-like side guard for the wheel of segmental form disposed against the first-mentioned side of the leg in vertical position and having a straight bottom edge, and an opening therein fitting around said annular flange, said guard having a vertical slot therein extending radially upwardly from said opening and fitting over said rib, and fasteners extending through the upper edge portion of said guard into said lateral flange.

CLARENCE LEO AERNI.